Sept. 11, 1956  W. W. HERRICK ET AL  2,762,049
AUTOMATIC ELECTRIC ARC VIEWING HELMET
Filed May 27, 1954  2 Sheets-Sheet 2

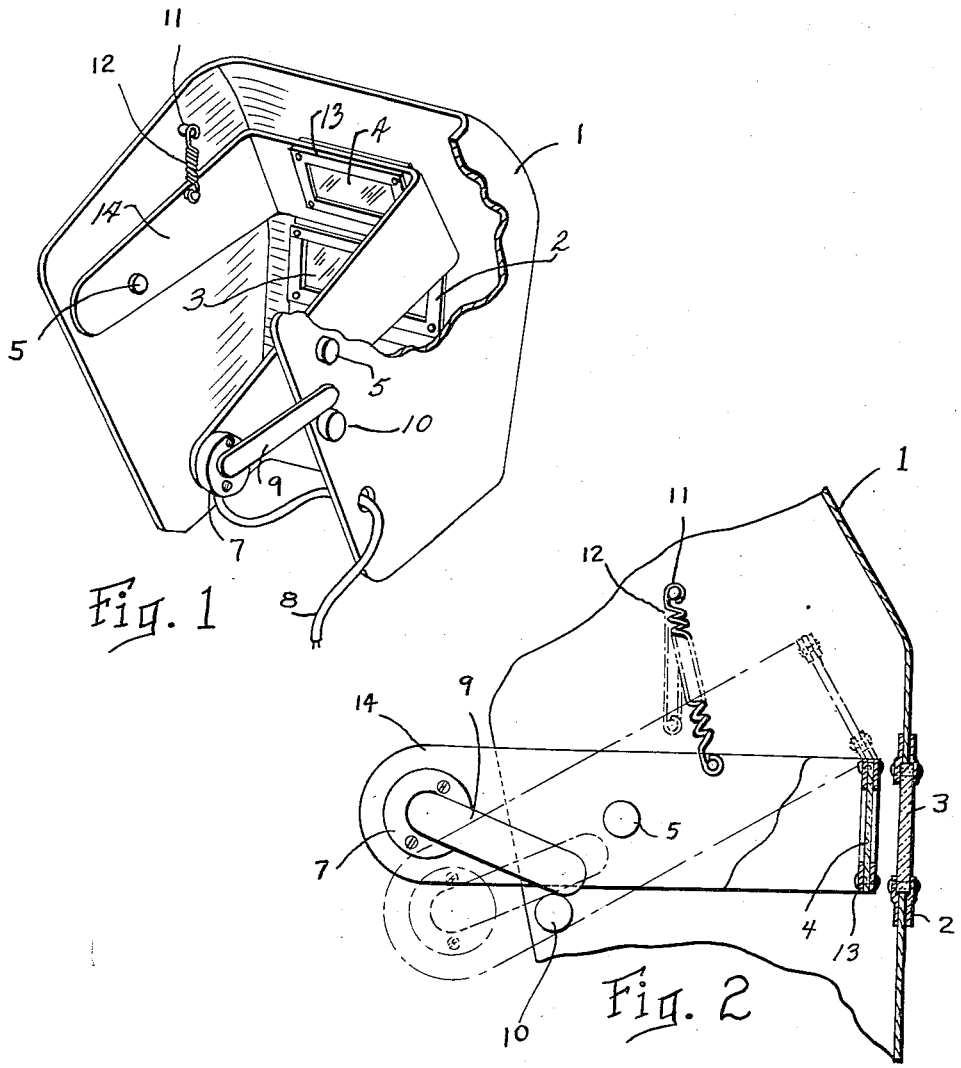

INVENTOR
William Wilson Herrick
James Elder Herrick

United States Patent Office 2,762,049
Patented Sept. 11, 1956

2,762,049

AUTOMATIC ELECTRIC ARC VIEWING HELMET

William Wilson Herrick and James Elder Herrick, Stamford, Conn.

Application May 27, 1954, Serial No. 432,802

4 Claims. (Cl. 2—8)

This invention relates to an improvement in power-actuated electric arc welding helmets.

More specifically, it concerns the weight distribution factor of the associated mechanism for power driving the dark arc viewing glass and which in the case of present practice usually involves the use of heavy solenoids coupled directly to a spring returned dark glass system. Under these conditions, it is necessary to use a comparatively heavy duty solenoid for lifting the dark glass directly against gravity and spring loading. Furthermore, it is to be noted that the dead weight of such mechanisms when concentrated on the frontal portion of a helmet, produce a turning moment about the welder's head, resulting in fatigue and annoyance.

The principal feature of this invention resides in counterbalancing the dark glass mechanism by means of the weight of the driving solenoid, said mechanism moving relatively to the helmet. This arrangement permits the use of a light solenoid to operate the mechanism in any plane with respect to gravity. Another feature of the invention resides in that the mass of all parts used in moving the dark glass have a center of gravity substantially central to the operator's head, therein eliminating excessive unbalance of the helmet. A further feature of the invention resides in that as all parts are in a state of near-static balance, a weak return spring may be used, which again contributes to the object of the invention of reducing the operating load of the driving solenoid.

Further features of the invention, together with objects, will become apparent as the description proceeds.

Figure 1 is a cut-away view of a welding helmet exposing the dark glass actuating mechanism.

Figure 2 is a diagrammatic cut-away sectional drawing showing in solid lines the dark glass and mechanism in a closed eye protective position; the broken lines indicate the mechanism in the open non-protective position.

Figure 3:
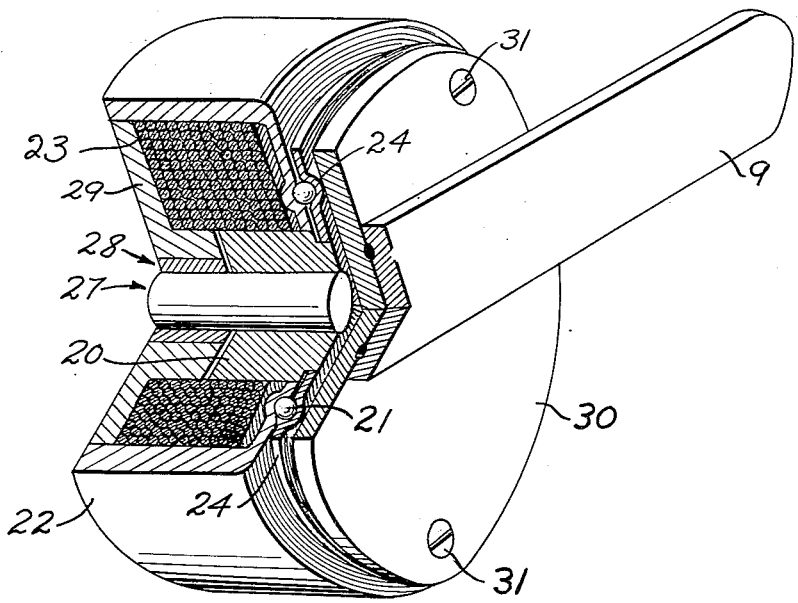
Figure 3 is a cut-away view of a rotary solenoid exposing the principal elements.

Referring now more specifically to the drawings, wherein like numerals designate similar parts throughout the two views, attention is directed first to Figure 1 wherein is illustrated a conventional form of welding shield 1 and containing the usual anti-spatter clear glass 3 held in place by a conventional frame 2.

The new and novel combinations in the helmet comprise a bracket 14, dark glass 4, dark glass frame 13, and solenoid 7. Said assembly is pivot-mounted on studs 5 set in helmet body 1. The relative mounting positions of studs 5 being such as to allow limited rotation of the assembly about the pivot axis by means of a rotary solenoid 7 whose position with respect to the pivot point is such as to substantially counterbalance the dead weight portion of extended bracket 14 and dark glass 4, except for the reaction of tension spring 12 secured to pin 11, which retains glass 4 in a raised position and out of the line of vision.

Figure 4:
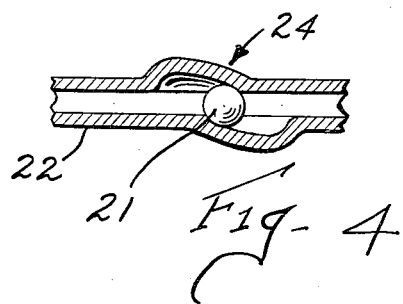
Figure 4 is an enlarged sectional view showing one of the sloped ball bearing races and the means by which linear motion is converted to rotary motion in the solenoid.

The operating principle of the above referred to solenoid 7 is best understood by studying Figures 3 and 4. In general the operation is similar to the more conventional pull type solenoid except that the armature is caused to rotate by means of sloped ball bearing races (see Figure 4). Referring to Figure 3, a more exact description of the rotary solenoid will be had. The stationary parts of the solenoid consist of the base 29, field winding 23 and armature bearing 28. These elements are press fitted together and are screw-fastened to bracket 14 shown in Figures 1 and 2. The armature assembly and moving element consists of iron core 20 press fitted into ring 24 and which incorporates three inclined sloped ball bearing races. Additionally, rotary armature shaft 27 is press fitted into iron core 20. Crank arm 9 is spot welded to a disc 30 which in turn is secured to ring 24 by means of screws 31. When field winding 23 is energized the armature assembly is magnetically urged toward the field winding. Now, since the armature assembly is separated from field winding by means of ball bearings 21 riding between ring 24 and case 22, it then follows that for the armature assembly to be moved toward the field winding, it must move by way of the radially sloped ball bearing races formed in case 22 and in ring 24 therein converting linear travel to rotary motion.

Figure 2 illustrates the operation and positioning of the dark viewing lens. The dark glass assembly is first portrayed in an open position, reference the broken lines and representing a no-flow condition of electric current to solenoid 7 screw-mounted to bracket 14. Here it will be noted that crank arm 9, an extension of the solenoid armature, bears against a cam stud 10 riveted into shield 1. In this regard, stud 10 serves as a fixed reaction point for the solenoid armature to bear against. When the solenoid is energized by an external current of electricity flowing through flexible input wires 8, the armature crank arm 9 causes the dark glass assembly to rotate about pivot studs 5 to the position shown in solid lines resulting in the dark glass 4 being positioned in the welder's path of vision as required for eye protection during welding.

Other variations of this principle may be practically applied to existing types of manually "lift-up" hinge-lensed welding helmets. This may be accomplished by mounting the driving solenoid to an arm extension of the existing hinged frame supporting the dark viewing lens so as to cause near-gravitational static balance of the assembly about the hinge pivot point. This arrangement, in principle, attains the objective in the disclosure shown in Figures 1 and 2 and makes it possible to utilize existing helmets of popular but somewhat different design.

Regarding the linkage drive, it may be varied from the cam and arm arrangement as portrayed, to that of a simple flexible wire drive; the most advantageous arrangement being dependent upon the characteristics and shape of the helmet under consideration.

From the foregoing, it will be seen that this invention entails lightness, near-static balance in all positions, and an absence of concentrated mass at any extremity of the helmet, and accordingly, it is not intended to limit the invention to the exact construction shown and described, but all suitable modifications and equivalents may be resorted to falling within the scope of the appended claims.

Having described the invention, what is claimed as new is:

1. The combination in an arc welding viewing mechanism comprising a shield generally U-shaped in cross section and provided with a viewing opening in the bight of the U between its upper and lower extremities, said shield fitted with a U-shaped bracket pivotally mounted to the shield and provided with a dark lens adapted to be moved into and out of covering relation with the viewing opening in the shield, that corresponding leg members of the shield and bracket are pivotally connected together on a common axis adjacent their outer ends and that one of the legs of the bracket is extended substantially beyond the pivotal axis and that an operating means is mounted on the extended leg portion of the bracket and where said operating means is provided with an actuating crank which is adapted to bear against a cam stud mounted in spaced relation to the pivot stud on the shield.

2. The combination in an arc welding viewing mechanism comprising a shield generally U-shaped in cross section and provided with a viewing opening in the bight of the U between its upper and lower extremities, said shield fitted with a U-shaped bracket pivotally mounted within the shield and provided with a dark lens adapted to be moved into and out of covering relation with the viewing opening in the shield, that the corresponding leg members of the shield and bracket are pivotally connected together on a common axis adjacent their outer ends and that one of the legs of the bracket is extended substantially beyond the pivotal axis and an operating means is mounted on the extended leg portion of the bracket and where said operating means is provided with an actuating crank which is adapted to bear against a cam stud mounted in spaced relation to the pivot stud on the shield.

3. The combination in an arc welding viewing mechanism comprising a shield generally U-shaped in cross section and provided with a viewing opening in the bight of the U between its upper and lower extremities, said shield fitted with a U-shaped bracket pivotally mounted within the shield and provided with a dark lens adapted to be moved into and out of covering relation with the viewing opening in the shield, that the corresponding leg members of the shield and bracket are pivotally connected together on a common axis adjacent their outer ends, and where one of the legs of the bracket is extended substantially beyond the pivotal axis and a rotary solenoid is mounted on the extended leg portion of the bracket and where said solenoid is provided with an actuating crank which is adapted to bear against a cam stud mounted in spaced relation to the pivot stud on the shield.

4. The combination in an arc welding viewing mechanism comprising a shield generally U-shaped in cross section and provided with a viewing opening in the bight of the U between its upper and lower extremities, said shield fitted with a U-shaped bracket pivotally mounted within the shield and provided with a dark lens adapted to be moved into and out of covering relation with the viewing opening in the shield, that the corresponding leg members of the shield and bracket are pivotally connected together on a common axis adjacent their outer ends, and where one of the legs of the bracket is extended beyond the shield and a rotary solenoid is mounted on the extended leg portion of the bracket and that said solenoid is provided with an actuating crank which is adapted to bear against a cam stud mounted in spaced relation to the pivot stud on the shield.

References Cited in the file of this patent

UNITED STATES PATENTS

| | | |
|---|---|---|
| 1,455,025 | Kern-Jenny et al. | May 15, 1923 |
| 2,036,224 | Lincoln et al. | Apr. 7, 1936 |
| 2,058,169 | Montague | Oct. 20, 1936 |
| 2,384,517 | Zimmerman et al. | Sept. 11, 1945 |
| 2,649,019 | Hartline et al. | Aug. 18, 1953 |
| 2,668,951 | MacLean | Feb. 16, 1954 |